United States Patent [19]

Langwell

[11] 3,994,368
[45] Nov. 30, 1976

[54] POWER UNIT

[76] Inventor: Howard C. Langwell, 344 N. 6th St., West Helena, Ark. 72390

[22] Filed: Sept. 2, 1975

[21] Appl. No.: 609,557

[52] U.S. Cl. .............................. 185/11; 185/40 R; 185/45
[51] Int. Cl.² .......................................... F03G 1/00
[58] Field of Search ............... 185/9, 10, 11, 37, 39, 185/40, 45

[56] References Cited
UNITED STATES PATENTS

| | | | |
|---|---|---|---|
| 195,795 | 10/1877 | Cavalier | 185/37 |
| 328,830 | 10/1885 | Wickizer | 185/37 |
| 329,295 | 10/1885 | Elliott | 185/37 |
| 1,723,484 | 8/1929 | Krepps | 185/37 |

*Primary Examiner*—Allan D. Herrmann
*Attorney, Agent, or Firm*—Huebner & Worrel

[57] ABSTRACT

A power unit having an increased capacity for utilizing the potential energy of a stressed spring over periods of extended duration. The power unit is characterized by a housing, a drive shaft projected from the housing and supported for rotation about its longitudinal axis, a radially expansive spring unit of a substantially circular configuration disposed within the housing and connected to both the shaft and the housing, and an expansion control unit including a fluid-actuated ram radially oriented with respect to the spring unit having a pressure pad of an arcuate configuration forcibly engaging the periphery of the spring unit for selectively accommodating radial expansion of the spring whereby energy is released at a selectively controlled rate.

9 Claims, 6 Drawing Figures

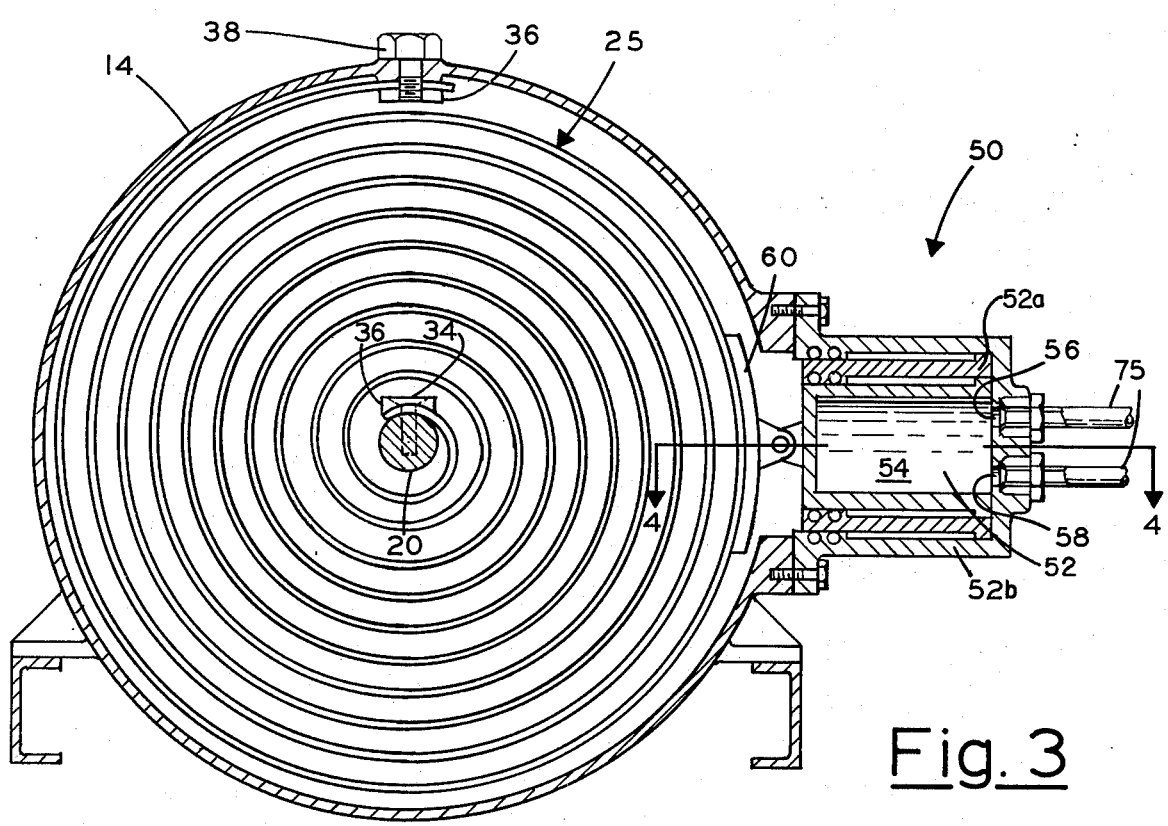
Fig. 3
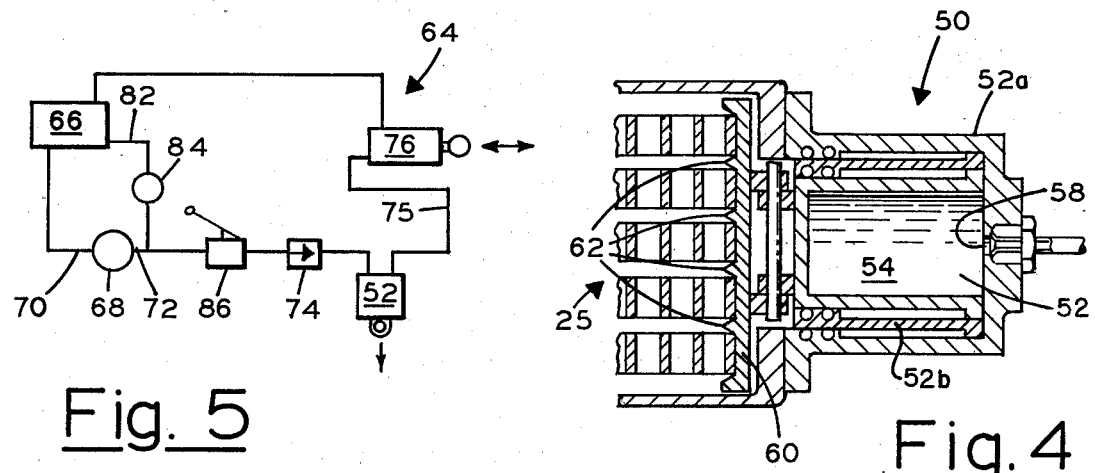
Fig. 5
Fig. 4
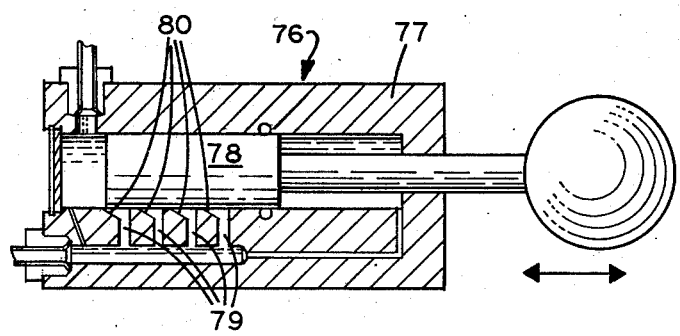
Fig. 6

3,994,368

POWER UNIT

BACKGROUND OF THE INVENTION

1. Field of the Invention

The invention generally relates to power units and more particularly to an improved power unit adapted to respond to radial expansion of a helical spring for imparting rotary motion to an output shaft provided therefor.

The advent of increased concern for environmental pollution and the coexisting concern for decreasing supplies of petroleum has caused a great deal of interest to be focused on the development of power units which can be utilized to replace petroleum fueled internal combustion engines. Unfortunately, to date, little progress has been made in developing engines which do not rely upon petroleum fuels. For example, exhaustive efforts in the further development of electrical power units for propelling automobiles and the like have, generally speaking, met with less than satisfactory results. As can be appreciated by those familiar with the development of such power units, potential energy is stored in electrical storage batteries capable of providing a d.c. output. Unfortunately, such batteries lack adequate storage capacity for storing quantities of energy sufficient for propelling a vehicle over relatively long distances, at relatively high speeds, due to the fact that the storage capacity of batteries of a weight suitable for use in vehicles is simply inadequate.

The use of power units which capitalize upon the generation of steam also have failed to satisfy existing needs as have nuclear power units.

2. Description of the Prior Art

The prior art is, of course, replete with spring-operated power units for use with very small vehicles of the type classed as toys and found in toy stores and similar commercial installations. Among some of the advantages which may be realized through a use of such power units is that such units are of a simple design, are of a relatively, generally lightweight construction and do not burn petroleum fuels. However, as can be fully appreciated by those familiar with the design and operation of power units for use in driving vehicles capable of transporting usable loads over relatively long distances such as those capable of transporting personnel and the like, the use of power units which utilize potential energy stored in stressed springs has not been widely accepted. It is believed that one reason for such nonacceptance is that it has not been deemed feasible to achieve adequate control of energy release for such units. Consequently, the use of springs for storing energy is power units having a capacity for use in driving load-transporting vehicles or for use as a stationary power plant has been substantially ignored.

It is, therefore, the general purpose of the instant invention to provide an improved power unit having an increased capacity for utilizing the potential energy of a stressed spring over periods of extended durations.

OBJECTS AND SUMMARY OF THE INVENTION

It is, therefore, an object of the instant invention to provide an improved power unit which overcomes the aforementioned difficulties and disadvantages.

It is another object to provide an improved, practicable power unit having an increased capacity for utilizing the potential energy of a stressed spring.

It is another object to provide a power unit having an increased capacity for utilizing the potential energy of a stressed spring at a practicable rate.

It is another object to provide an improved power unit having a rotary output shaft, a helical spring unit concentrially related to the shaft, and expansion control means for controlling the radial expansion of the spring unit whereby the rate at which power is delivered by the power unit is precisely controlled.

It is another object to provide an improved power unit particularly suited for use in driving vehicles employing potential energy stored in a stressed spring and characterized by a capability for transporting usable loads over relatively long distances.

Another object is to provide a spring-driven power unit which is particularly suited for use in driving overland vehicles, although not necessarily restricted to use therewith, since the power unit may be similarly useful when employed as a power plant having general utility such as when serving as a stationary power plant, as will become more readily apparent by reference to the following description and claims in light of the accompanying drawings.

BRIEF DESCRIPTION OF THE DRAWINGS

FIG. 3 is a partially sectioned view, taken generally along line 3—3 of FIG. 1, also illustrating the spring unit.

FIG. 4 is a side elevation of a ram and pressure pad provided for controlling the rate of expansion of the spring unit illustrated in FIGS. 1 and 2.

FIG. 5 is a schematic view depicting a hydraulic system which includes the ram shown in FIG. 4.

FIG. 6 is a cross-sectional view of a pressure relief valve provided for controlling the ram shown in FIG. 4.

DESCRIPTION OF THE PREFERRED EMBODIMENT

Figure 1:
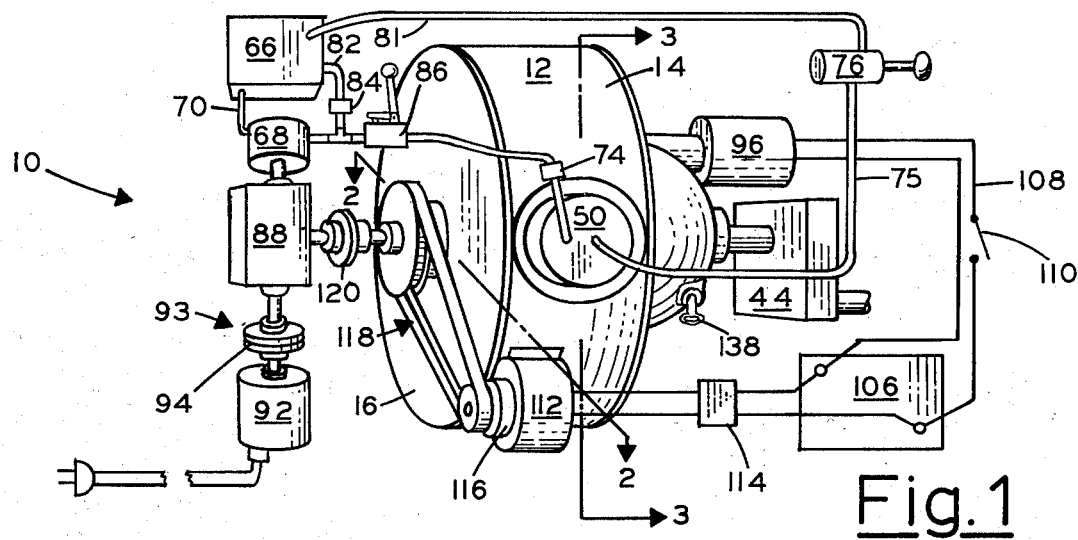
FIG. 1 is a perspective view of a power unit which embodies the principles of the instant invention.

Referring now to the drawings wherein like reference characters designate like or corresponding parts throughout the several views, there is shown in FIG. 1 a power unit, generally designated 10, which embodies the principles of the instant invention.

As shown in FIG. 1, the power unit 10 includes a housing 12 of a substantially cylindrical configuration formed of materials possessing suitable strength characteristics. Since the housing 12 can be formed of any material characterized by a suitable strength/weight ratio, such as high-strength steel alloys, the specific material from which the housing 12 is fabricated forms no specific part of the instant invention and, therefore, a detailed description of the material is omitted in the interest of brevity.

The housing 12 comprises an annular wall 14 and a pair of transversely related end plates 16 and 18. Extended concentrically through the housing is a segmented drive shaft 20. The drive shaft 20 is supported for rotation by a pair of mutually spaced annular bearings 22 and 24 mounted in the end plates 16 and 18, respectively. The bearings 22 and 24, of course, are of a suitable design and are seated in suitable supporting structure, not designated, well within the purview of the art. It is to be understood that should the power unit 10 be employed in environments wherein it is necessary, or even desirable to accommodate hermetic sealing of the housing 12, the bearings 22 and 24 are suitably supported.

Concentrically related to the drive shaft 20 there is a spring unit 25 which comprises a plurality of coaxially aligned helical springs 26 through 30 which collectively function as a single helical spring. Therefore, where so desired, a single spring can be employed in lieu of the plurality of springs 26 through 30.

The springs 26 through 30, as shown, are approximately one-eighth inch in thickness, 2 ½ inches to 3 inches in width, have a length of 70 feet and ¾ inches, and are characterized by a moment of 5160 inch pounds. The springs 26 through 30 are uniformly spaced at distances of approximately ½ inch with the outermost end thereof being rigidly affixed to the housing 12, while the innermost end thereof is rigidly affixed to the drive shaft 20. It should, of course, readily be apparent that the size, number and energy storage capacity of the springs are varied as desired, without departing from the scope of the invention as herein disclosed.

Figure 2:
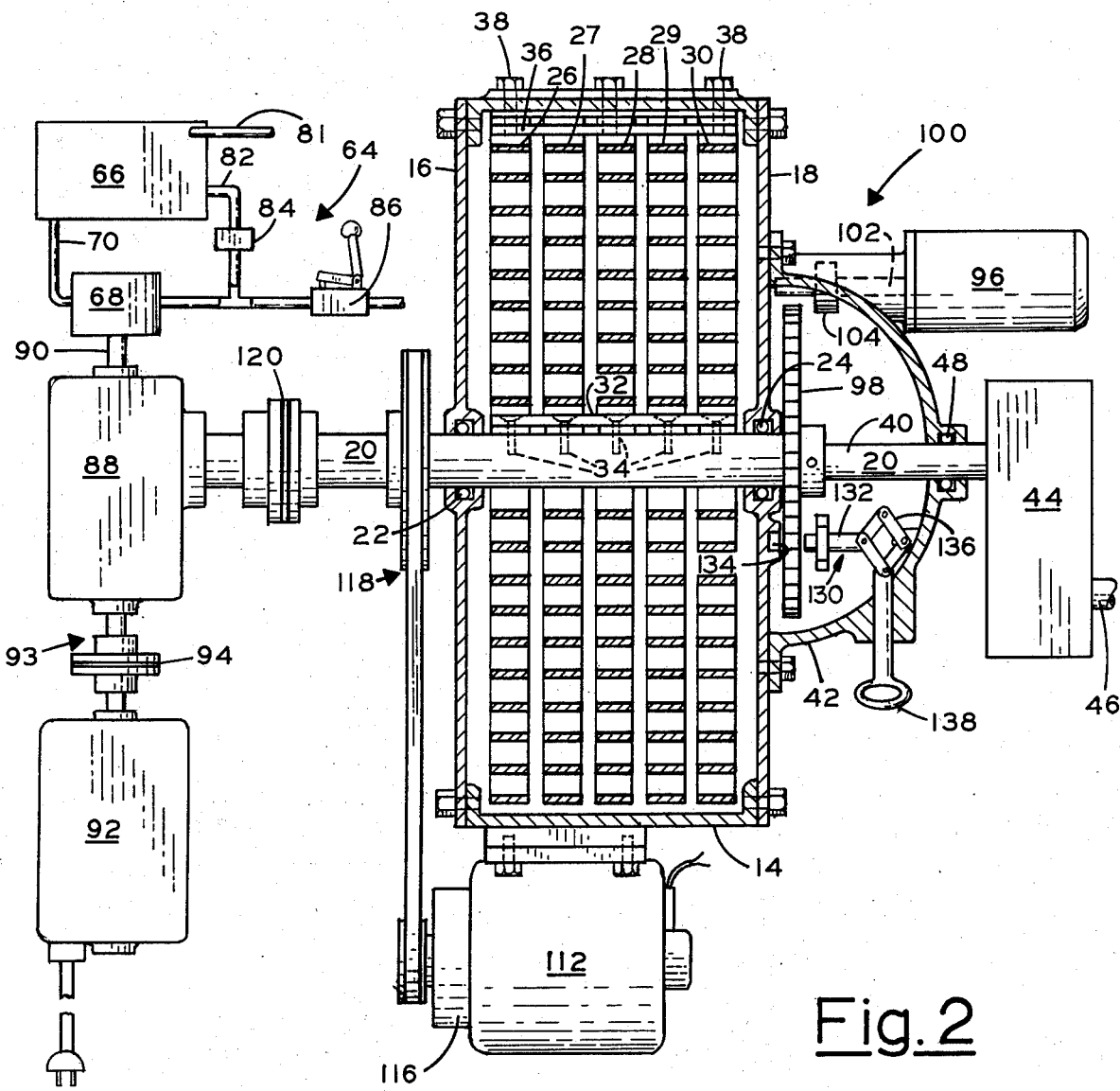
FIG. 2 is a partially sectioned plan view of the power unit, taken generally along line 2—2 of FIG. 1, illustrating a spring unit employed by the power unit.

The particular manner in which the springs 26 through 30 are affixed to the annular wall 14 and the drive shaft 20 also is varied as desired. As shown, an elongated plate 32 is seated on the innermost end of the springs 26 through 30 while screw-threaded studs 34 are extended therethrough and screw-threaded into suitably formed threaded openings provided in the shaft 20. The opposite ends of the springs 26 through 30 are similarly secured to the annular wall 14 employing plates 36 fastened by bolts 38 extended through the plate, springs and the wall 14, as best illustrated in FIG. 2.

The drive shaft 20 includes an output segment 40 extended through a bell housing 42 suitably mounted on the end plate 18. To the distal end of the output segment 40 of the drive shaft 20 there is connected a gear reduction unit 44 of a suitable design. Preferably, the unit 44 includes an output shaft 46 adapted to be included in a power train, not shown. As will hereinafter become more readily apparent, the power unit 10 is, in effect, a high-torque, low-speed power unit. Consequently, the output shaft 46 of the gear reduction unit 44 preferably is driven at a rate dictated by the angular velocity of the output segment but at a substantially higher angular velocity. Of course, it should be apparent that where a high-torque, low-speed output is desired, the gear reduction unit 44 can be omitted. Additionally, it is to be understood that the segment 40 of the drive shaft 20 is supported by a suitable bearing, such as the annular bearing designated by the reference numeral 48, concentrically mounted within the bell housing 42.

It should, at this point, be understood that as the springs 26 through 30 are released for expansion, potential energy is thus released by the springs. Consequently, the springs serve to impart an angular velocity or rotary motion to the output segment 40 of the drive shaft 20 which velocity ultimately is multiplied and transmitted to the shaft 46 via the gear reduction unit 44.

In order to control the rate at which energy of the springs 26 through 30 is released, and thus control the angular velocity of the output segment 40 of the drive shaft, there is provided an expansion control unit 50 mounted on the housing 12 in juxtaposition with the spring unit 25.

As best shown in FIG. 3, the expansion control unit 50 includes a ram 52 of a telescopic design rigidly affixed to the housing 14 in a radially extended relationship therewith. The ram 52 includes a plurality of axially extensible segments, designated 52a and 52b which collectively define an expansible pressure chamber 54. This chamber includes a fluid inlet port 56 and a fluid outlet port 58. The ram 52 is radially oriented with respect to the spring unit 25, with the distal end thereof being arranged in juxtaposition with the spring unit. A pressure pad 60 is connected at the distal end of the ram and seated in simultaneous engagement on the spring 26 through 30. In practice, the pressure pad 60 is of an arcuate configuration and includes a plurality of aligned protrusions which extend radially between the springs and function as separators, designated 62. The separators 62, in practice, extend radially between the springs 26 through 30 and at the opposite ends of the spring unit 25, as well, for maintaining proper alignment thereof during operation.

It is to be understood that the pressure pad 60 includes a polished face for reducing sliding friction and is connected with the innermost or distal segment of the segmented ram 52 through a wrist pin or other suitable pivotal coupling, not designated. Thus, the pressure pad 60 continuously engages the periphery of each of the springs 26 through 30 of the spring unit 25 and serves to control the rate of their expansion by applying thereto a variable, radially directed force.

Consequently, it is to be understood that as the pressure within the pressure chamber 54 is relieved, via the outlet port 58, the spring unit 25 acts against the pressure pad 60 causing the pressure pad to be retracted, radially, for thereby accommodating an expansion of the spring unit. Of course, as the spring unit expands, responsive rotary motion is imparted to the drive shaft 20. This motion, ultimately, is transmitted via the output segment 40 of the drive shaft to the gear reduction unit 44.

Control of the expansion control unit 50 is achieved through a hydraulic circuit generally designated 64, best illustrated in FIG. 5.

It is important here to appreciate that the hydraulic circuit 64 during the operation of the power unit 10 remains in a constantly activated operative state so that the pressure chamber 54 remains constantly pressurized. Thus the segmented ram 52 continuously serves to urge the pressure pad 60 into expansion retarding engagement with the periphery of the spring unit 25. In order to accommodate selective expansion of the spring unit 25, pressure within the pressure chamber 54 is selectively reduced for permitting the segmented ram 52 to retract at a desired rate.

In order to achieve a selective control of the pressure within the chamber 54, the circuit 64 includes a suitable reservoir, designated 66, connected at the intake side of a pump 68 through a suitable conduit 70. The discharge side of the pump 68 is connected through a conduit 72 with the inlet port 56 of the pressure chamber 54 of the ram 52. Within the conduit 72, adjacent to the ram, there is provided a one-way check valve 74 which serves to assure that pressure developed within the chamber 54 cannot be bled in a reverse direction through the conduit 72.

The outlet port 58 of the chamber 54 is connected with a conduit 75 through a throttle valve 76, having a variable flow rate is connected to the chamber. The throttle valve 76 includes a piston housing 77 having mounted therein an axially displaceable piston head 78. The head 78 is of a cylindrical configuration and is axially displaceable within an elongated bore, not designated, having a plurality of relief ports 79 arranged in longitudinal alignment for purposes of increasing the effective cross-sectional area of the discharge side of the throttle valve as acceleration of the decrease in pressure within the chamber 54 is desired. As a practical matter, each of the ports 79 includes a bleeder channel 80 which communicates with the bore in order to accommodate establishment of flow through each of the ports 79 before the port is uncovered by the piston head whereby a smooth transition is achieved between the flow rates through the throttle valve. In order to balance the pressure load across the piston head 78 a relief bore, not designated, is extended to communicate with the opposite end faces of the head.

The throttle valve 76 is, in turn, connected at its return side with the reservoir 66, through a return conduit 81. It will, therefore, be appreciated that the throttle valve 76 serves to control pressurization of the chamber 54 of the ram 52. Depressurization of the chamber is achieved by repositioning the piston head 78 for permitting the fluid to be discharged from the chamber 54 and returned to the reservoir 66 at a rate greater than that at which the fluid is delivered to the chamber.

It is important to fully appreciate that the throttle valve 76, when closed, serves to confine fluid under pressure within the chamber 54. However, so long as the pressure within the chamber 54 remains adequate to support the ram 52 against retraction, the pressure pad 60 remains stationary, due to the resistance offered by the spring unit 25. Of course, once the radially directed forces of the spring unit 25 overcomes the pressure within the chamber 54, the ram 52 retracts for permitting the springs 26 through 30 to undergo expansion for thus imparting rotary motion to the shaft 20 at a rate determined by the rate of expansion for the spring unit 25. Consequently, the rate at which the pressure is relieved within the chamber 54 dictates the rate at which the spring unit 25 imparts an angular velocity to the shaft 20.

As a practical matter, the circuit 64 is provided with a by-pass conduit 82 including a pressure relief valve 84 which permits the fluid to flow directly from the pump 68 back to the reservoir 66 for preventing overpressurization of the system and to thus protect the pump 68. Consequently, it will be appreciated that the pressure relief valve 84 is set at a selected value which, in practice, establishes the maximum pressure that can be developed within the chamber 54.

Moreover, it may be desirable to charge the system prior to activating the power unit 10. Therefore, a hand pump 86 preferably is connected in the circuit between the pump 68 and the check valve 74, for purposes of accommodating a charging of the pressure chamber 54, through a manual operation, while the power unit 10 remains inoperative.

It will be appreciated, of course, that in operation, the power unit 10 serves to drive the pump 68 for thus pressurizing the circuit 64. The pump 68, during the operation of the power unit 10, is driven through a power train including a gear box 88 which serves to connect the drive shaft 20 with an input shaft, designated 90, for the pump 68. The gear box 88 is connected with the drive shaft 20 in a manner such that the output of the drive shaft 20 is multiplied as it is transmitted through the gear box 88 to the shaft 90.

In order to wind or stress the springs 26 through 30, of the spring unit 25, there is provided an a.c. motor 92, which also is connected with the gear box 88. The motor 92 serves to impart rotary motion to the drive shaft 20 through the gear box 88 for stressing, or winding, the springs by tightening them about the drive shaft 20, in response to a selected rotation thereof.

As a practical matter, a coupling 93 including a one-way clutch 94 is provided for interconnecting the motor 92 with the gear box 88. Consequently, when the gear box 88 is being driven in response to a rotation of the drive shaft 20, the motor 92 remains disconnected from the gear box through the operation of the one-way clutch 94. While not shown, it is to be understood that a similar clutch can be interposed between the pump 68 and the gear box 88 for purposes of disconnecting the pump from the gear box when the motor 92 is employed for driving the drive shaft 20 in a direction to achieve stressing of the springs.

It is important to appreciate that the motor 92 serves to stress the springs of the spring unit 25 when the power unit 10 is in a quiescent configuration. Such may occur where the power unit is employed as a power plant for a vehicle and the vehicle is parked overnight.

Of course, should the power unit 10 be employed in driving a vehicle over long distances, the vehicle may come to rest at locations remote from an a.c. power source. In order to wind or stress the springs of the spring unit 25, there is provided a d.c. motor 96 mounted in juxtaposition with the bell housing 42, and a bull gear 98 mounted on and rigidly affixed to the drive shaft 20.

The d.c. motor 96 is coupled with the bull gear 98 through a suitable power train 100. Preferably, the power train 100 includes an axially extensible drive shaft 102 which responds to an energization of the motor 96, and has mounted at its distal end a spur gear 104 adapted to mesh with the peripheral teeth of the bull gear 98 for thus imparting rotary motion to the drive shaft 20 as the shaft 102 is driven in rotation by the motor 96.

The motor 96 is connected with a d.c. battery 106 through leads 108 having included therein a switch 110, as best illustrated in FIG. 1. It can be appreciated that the windings of the motor 96 are energized upon a closing of the switch 110.

In some instances, it may be found desirable to provide for a charging of the battery during the operation of the power unit 10, particularly where the unit is operated for periods of extended duration. Therefore, an alternator 112 is connected with the battery 106 through a suitable rectifier circuit 114, in a manner well understood by those familiar with the design of a.c./d.c. electrical circuits. The alternator 112 is mounted on the housing 12 and is connected to the drive shaft 20 through a velocity multiplying gear box 116 driven by a belt-and-sheave coupling, generally designated 118, connected to the drive shaft 20. The gear box 116 is of a suitable design capable of gearing-up the output of the coupling 118 for driving the alternator at suitable rates.

It will, of course, be appreciated that while the utility of the power unit 10 is greatly enhanced through the use of motors 92 and 96, other mechanisms can be employed for purposes of driving the drive shaft 20 in order to stress the springs of the spring unit 25 for purposes of storing energy. Additionally, the motor 92 can be stationary and coupled with the gear box 88 through disconnects, not shown, whereby transport of the motor 92 is not necessitated for thereby reducing weight.

Moreover, where so desired, a one-way clutch 120 is included in the drive shaft 20 between the bull gear 98 and the gear box 88 so that the gear box 88 is disconnected from the drive shaft 20 as the motor 96 is employed to the drive shaft 20 for purposes of stressing the springs of the spring unit 25.

The power unit 10 can be secured against operation through the use of a locking pin assembly 130 including a locking pin 132 adapted to be extended through suitable bores, not shown, formed in the bull gear 98 and seated in a socket 134. A toggle linkage 136 is provided for driving the pin 132 along a rectilinear path. As a practical matter, a handle 138 is connected with the toggle linkage 136 for purposes of facilitating actuation of the linkage in order to drive the pin 132 in reciprocation.

The power unit 10 thus assembled can be employed for use as a stationary power plant, as well as a power plant for vehicles of a general nature including carts, boats and the like.

OPERATION

It is believed that in view of the foregoing description, the operation of the device will readily be understood and it will be briefly reviewed at this point.

With the power unit 10 assembled in the manner hereinbefore described, and connected with a selected power train through the shaft 46, the unit is prepared for operation.

Assuming that the springs 26 through 30 of the spring unit 25 have been stressed for thus storing energy, the power unit 10 is prepared for operation. Furthermore, in order to assure that the pressure chamber 54 is suitably pressurized for positioning the pressure pad 60 in operative engagement with the springs, the hand pump 86 is actuated while the locking pin 132 of the assembly 130 secures the bull gear 98 of the power unit 10 from rotation.

The bull gear 98 is released for rotation through a manipulation of the handle 138. The rate at which the spring unit 25 is permitted to expand is controlled by the rate at which the pressure pad 60 is retracted in a radial direction relative to the spring unit 25. The rate of retraction of the pressure pad 60 is, in turn, dictated by the rate at which the pressure of the chamber 54 of the ram 52 is reduced through a delivery of fluid through the conduit 75 and the throttle valve 76. The rate of the flow of fluid through the conduit is, in turn, dictated by the position of the piston head 78 within the bore of the housing 77 of the valve 76. As the piston head 78 is withdrawn for uncovering additional outlet ports 79 the flow rate through the throttle valve is increased for thus increasing the rate at which the pad 60 is retracted relative to the spring unit 25. As a consequence, the rate at which the springs of the unit 25 expand is increased for thus accelerating the rate at which the drive shaft 20 is driven in rotation.

In a reverse fashion, the rate at which the drive shaft 20 is driven is reduced simply by reducing the number of outlet ports 79 closed by the piston head 78. Thus the pressure within the pressure chamber 54 of the segmented ram 52 may be increased for reducing the rate for retraction of the pressure pad 60.

As rotary motion is thus imparted to the drive shaft 20, the output segment 40 of the drive shaft 20 serves to drive the output shaft 46, through the gear box 44, at a rate proportional to the rate at which the drive shaft 20 is driven. The output shaft 46, in turn, serves to drive the power train, in a manner well understood by those familiar with power trains.

In order to provide for a continuous pressurization of the pressure chamber 54, the input shaft 90 for the pump 68 is driven through the gear box 88 by the drive shaft 20. The pump 68, in turn, delivers a flow of fluid, under pressure, from the reservoir 66, to the chamber 54. In the event the pressure within the chamber 54 exceeds a predetermined level, the pressure relief valve 84 permits a by-pass of fluid from the pump to the reservoir to occur.

Assuming that the motor 92 is to be employed in storing energy in the spring unit 25, the motor 92 is energized by inserting a suitable plug within an outlet, such as may be provided for a 220 volt a.c. circuit. As the motor 92 is driven, the gear box 88 transmits the rotary motion to the drive shaft 20 whereupon the drive shaft is rotated for again stressing the springs of the spring unit 25. In the event the motor 96 is to be employed for stressing the springs, the switch 110 is closed, whereupon the battery 106 serves to apply voltage across the windings of the motor causing the power train 100 to be activated, whereupon the spur gear 104 is meshed with the peripheral teeth of the bull gear 98. Continued energization of the motor 96 serves to impart rotary motion to the bull gear for thus stressing the springs 26 through 30 of the spring unit 25 in order to store energy in the power unit 10.

In view of the foregoing, it is believed to be readily apparent that the power unit which embodies the principles of the present invention provides a practical solution to the problem of replacing, and at least under certain circumstances and in certain environments, internal combustion engines with power plants which are practical, safe and economical to operate and which utilize electrical energy without the difficulties and disadvantages which normally attend a use of electrically powered units provided for use as power plants for vehicles and the like.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A power unit comprising:
   A. means defining a housing;
   B. a drive shaft supported for rotation about an axis extended through the housing;
   C. means for imparting rotary motion to said shaft including a radially expensive helical spring characterized by a substantially cylindrical periphery disposed within said housing, having one end thereof affixed to said shaft and the opposite end thereof affixed to said housing; and
   D. expansion control means for conrolling radial expansion of said spring including a pressure pad disposed in engagement with the periphery of said helical spring and supported for radial displacement relative to said spring, and means for controlling radial displacement of the pad.

2. The power unit of claim 1 wherein said means for controlling radial displacement of said pad includes a fluid-actuated ram mounted on said housing in radially extended relation with said spring, and adapted to be extended and retracted at variable rates, means for connecting said pad to said ram, whereby the pad is supported by said ram for displacement along a rectilinear path radially extended with respect to said spring, and means including a throttle valve connected with said ram for controlling the rate of extension and retraction thereof.

3. The power unit of claim 2 wherein said helical spring comprises one of a plurality of coaxially aligned springs.

4. The power unit of claim 2 wherein said means for controlling the rate of extension and retraction of said ram further includes means for pressurizing the ram including a source of fluid, a fluid pump having an inlet port connected with said source of fluid and a discharge port connected with said ram, and means for connecting said pump in driven relation with said drive shaft for driving the pump as rotary motion is imparted to said shaft.

5. The power unit of claim 4 wherein said means for connecting said pump with said drive shaft includes gear reduction means interposed in driving relation therebetween and said throttle valve includes a return side connected to said source of fluid.

6. The power unit of claim 5 further comprising means for stressing said spring including an a.c. motor disposed adjacent to said housing and connected to said drive shaft.

7. The power unit of claim 6 further comprising means for stressing said spring including a d.c. motor and a gear train for connecting selectively energizing said d.c. motor.

8. The power unit of claim 4 wherein said means for controlling radial displacement of said ram further includes a pressure return line connected between said ram and said source of fluid, and pressure-relief means connected in said pressure return line.

9. The power unit of claim 4 wherein said throttle valve comprises a selectively operable flow control valve including a valve housing having a bore defining a fluid chamber communicating with said ram, a piston supported for linear displacement within the bore, and a series of relief ports communicating with said bore and with a common return side for said source of fluid, each being of a varying dimension, and adapted to be alternately covered and uncovered by said piston as axial displacement is imparted thereto.

* * * * *

UNITED STATES PATENT AND TRADEMARK OFFICE
CERTIFICATE OF CORRECTION

PATENT NO. : 3,994,368
DATED : November 30, 1976
INVENTOR(S) : Howard C. Langwell It is certified that error appears in the above–identified patent and that said Letters Patent are hereby corrected as shown below:

Column 1, line 54, delete "is" and insert ---in---.

Column 4, line 15, delete "spring" and insert ---springs---.

Column 8, line 65, delete "conrolling" and insert ---controlling---.

Column 10, line 10, after "connecting", insert ---said d.c. motor with said drive shaft, and a d.c. voltage source for---.

Signed and Sealed this

Fifteenth Day of February 1977

[SEAL]

Attest:

RUTH C. MASON
*Attesting Officer*

C. MARSHALL DANN
*Commissioner of Patents and Trademarks*